Patented Apr. 6, 1937

2,076,507

UNITED STATES PATENT OFFICE 2,076,507

COATING COMPOSITION

Victor H. Turkington, Caldwell, N. J., assignor to Bakelite Corporation, New York, N. Y., a corporation of Delaware No Drawing. Application February 28, 1929, Serial No. 343,574

14 Claims. (Cl. 134—26)

This invention relates to the preparation of coating compositions from phenolic resins and fatty oils and which possess the property of drying in air to form serviceable homogeneous films.

It is known that phenolic resins can be made soluble in, or miscible with, fatty oils by the addition of rosin or other natural resins of acidic character to the raw ingredients from which the resin is prepared, or to the resin itself while still in a molten condition, and thereby made suitable for varnishes. Moreover, I have disclosed in a Patent 1,677,417 granted July 17, 1928, that varnishes containing fatty oil and phenolic resins can be obtained by reacting fatty oil with a phenolic body in the presence of a converting agent, such as phosphoric acid, and by further reacting with a hardening agent in conjunction with a blending agent, such as rosin, to control polymerization and prevent separation of the resinous content in solvents; the resulting product possesses the highly desirable property of depositing from a solution a non-sticky homogeneous film, upon evaporation of volatile solvents, without dependence upon oxidation of oil. The addition of a blending agent such as rosin is, however, objectionable in that it lessens the durability of a deposited film and imparts acid characteristics to a varnish containing it which renders the varnish unsuitable for many uses and prohibits the addition of basic pigments, as zinc oxide, due to the tendency to "liver" or jell.

The present invention provides varnish compositions of the phenolic resin type having the property of drying at room temperature to a clear homogeneous and serviceable film without the inclusion of rosin. It has for its basis the discovery that, when a phenolic body as cresol, a fatty oil like tung oil and hexamethylenetetramine are heated together rapidly to 200° C., a complex compound is quickly formed and, unlike the hitherto known compositions containing considerable proportions of phenolic resins, it is easily and completely soluble in such solvents as turpentine and petroleum distillates. The varnishes so formed are exceedingly durable on exposure to weather and have excellent adhesion, gloss and toughness.

In the above reaction the hexamethylenetetramine serves not only as a methylene-containing or hardening agent in the production of a resinous material, but in addition supplies the converting agent or catalyst for promoting the reaction between cresol and tung oil. In this latter aspect it takes the place of acid catalysts, phosphoric acid, etc., as described in patent to Byck 1,590,079 granted June 22, 1926, and without the disadvantages of the latter of requiring removal by washing or neutralization particularly when used in proportions in excess of three per cent by weight of the phenol. Furthermore, when hexamethylenetetramine is used in amounts sufficient to supply the necessary methylene groups for reacting with the phenolic body to yield a resinous product, the reaction is quite rapid requiring only a few minutes of heating instead of several hours. When small amounts of hexamethylenetetramine are used, the reaction is slower and the product can be further heated if desired with some other hardening agent, as formaldehyde, paraformaldehyde or other methylene-containing body, to supply the balance of methylene groups required.

The compositions herein described differ from the reactive type of phenol resin hitherto known in that they may be heated to 200° C. or even as high as 250° C. for a short time without polymerization to a rubbery or insoluble mass. They are also capable of taking up oxygen from the air when an excess of fatty oil is used and drying to hard tough films at room temperature, the drying being accelerated by the addition of metallic driers commonly used in oil varnishes such as cobalt, lead or manganese resinates, tungates, or linoleates.

In preparing these varnishes, various proportions and methods of procedure can be employed, and for the purpose of illustration several examples are given.

*Example 1.*—100 parts of commercial cresol, 200 parts of tung oil and 25 parts of hexamethylenetetramine (all parts by weight) are heated rapidly to 190 or 200° C. with good stirring in a vessel which may be open, but preferably provided with a reflux condenser to permit the escape of ammonia but prevent the loss of cresol. In this reaction hexamethylenetetramine apparently combines with cresol to set free anhydrous ammonia which in turn acts as a catalyst to cause cresol to unite with tung oil; as the reaction proceeds, ammonia is driven off. The heating is continued until the material reaches a desired consistency, and solvents, such as turpentine, petroleum distillates, toluol, xylol, etc., are then added. A small amount of drier, for example, one part of linoleate paste, is preferably included in the varnish when cold. The varnish is then ready for use.

*Example 2.*—100 parts of cresol and 200 parts of tung oil are heated to about 190 to 200° C. and then 25 parts of hexamethylenetetramine are gradually included, the temperature being maintained until the desired consistency is obtained. Solvents, etc., are added as in the first example to form the varnish. By this method the reaction is more readily controlled, and more uniform final products are obtainable than by the method of the first example.

*Example 3.*—100 parts of cresol, 200 parts of tung oil and 10 parts of hexamethylenetetramine are heated together, either as in Example 1 or Example 2, at about 200° C. and the reaction mass is then cooled to about 100° C. when 25 parts of paraformaldehyde are added. Heating is continued at this low temperature for a time and then gradually raised to about 160° C. and maintained at that temperature until the consistency found desirable is reached. The mass is then treated with solvents, etc., as above. This method is found to yield a varnish that is lighter in color than the preceding.

*Example 4.*—100 parts of cresol, 100 parts of tung oil, and 5 parts of hexamethylenetetramine are heated together at about 200° C. for a period and then cooled to about 100° C. whereupon 90 parts of formaldehyde solution (40%) are added and refluxed. The mass is dehydrated by heating to about 150° C. and heating continued at this temperature until a cooled sample shows toughness and only a slightly tacky condition. The product is dissolved in toluol or xylol or mixtures of these with turpentine or petroleum distillates, yielding a "short" oil varnish suitable for interiors, furniture, etc., and having satisfactory durability when applied to metal for outdoor use.

*Example 5.*—100 parts of cresol, 75 parts of tung oil, 25 parts of hexamethylenetetramine and 100 parts of a solvent such as hexalin (cyclohexanol) are refluxed for several hours. After the reaction, the solvent can be distilled out and other solvents, such as a mixture of toluol and alcohol can be substituted to make the varnish. This method of carrying on the reaction in a high boiling solvent is found desirable when the ratio of tung oil to cresol is less than about 1 to 1 and yields a "short" oil varnish.

Any phenolic body can be used as a raw ingredient in the manufacture of varnishes in accordance with this invention. While it is found that phenol itself does not uniformly give a good product, phenols of increasing molecular weight show a correspondingly decreasing tendency to form insoluble materials which precipitate out. Therefore, the more complex coal tar acids, boiling between 195° C. and 240° C., and phenols of still higher molecular weight, including phenols with two or more benzene rings, are eminently suitable; parahydroxy diphenyl, for example, yields varnishes that are exceedingly waterproof and resistant to weak alkalies. For manufacturing black enamels, cresols or other phenolic bodies containing considerable proportions of coal tar can be used to give an inexpensive black enamel of greater durability than the present commercial black japans. Light colored varnishes necessarily require the absence of suspended matter or dark colored impurities, and consequently for this purpose distillation of the phenolic body before using is desirable.

In place of tung oil, other fatty oils can be substituted, such as linseed, perilla, soya bean or mixtures of these with tung oil.

From the foregoing it is obvious that the resinous body so obtained can be used in conjunction with other materials that may be found desirable as additions to the varnish, as for example pigments, fillers, etc. The nature of the deposited film is such, however, that it has inherent toughness and flexibility, and plasticizers or high boiling solvents are accordingly not required, thus obviating the addition of such an ingredient and the procedural step necessary to its incorporation.

In the foregoing description and the claims which follow the term "resinous" is used. This term is commonly applied in the art to which this application relates, to reaction products obtained either in the liquid or solid state. Where large amounts of oil are incorporated as specifically indicated in Examples 1, 2 and 3 the product does not reach a solid condition at normal room temperatures as is evident from statements made in those examples as to the characteristic of the material. The term "resinous" therefore as used herein is not to be restricted to a normally solid product, but to include products in the liquid state as well.

I claim:

1. A liquid coating composition comprising in solution the resinous product obtained by the reaction of a phenol with a fatty oil in the presence of hexamethylenetetramine at a temperature of substantially 190–200° C.

2. Composition of matter comprising the resinous product obtained by the reaction of a hydroxydiphenyl with a fatty oil in the presence of hexamethylenetetramine.

3. Composition of matter comprising the resinous product obtained by the reaction of parahydroxydiphenyl with a fatty oil in the presence of hexamethylenetetramine.

4. Composition of matter comprising the resinous product obtained by the reaction of a phenol, a fatty oil and hexamethylenetetramine in the presence of a solvent for the oil and a hardenable phenol-aldehyde condensation product.

5. Composition of matter comprising the resinous product obtained by the reaction of a phenol, a fatty oil and hexamethylenetetramine in the presence of hexalin.

6. A liquid coating composition comprising in solution the resinous product obtained by the reaction of a cresol with tung oil in the presence of hexamethylenetetramine at a temperature of substantially 190–200° C.

7. A composition of matter comprising the resinous product obtained by the reaction of a phenol with a fatty oil in the presence of hexamethylenetetramine at a temperature of substantially 190–200° C.

8. Process for preparing a composition of matter from a phenol and a fatty oil which comprises bringing about a condensation reaction between the phenol and the fatty oil in the presence of hexamethylenetetramine at a temperature approximating 190–200° C.

9. A process for the preparation of synthetic resinous compounds which consists in heating together a phenol, formaldehyde and an ester of a fatty oil acid in the presence of a substantial quantity of a volatile organic solvent, said solvent being a solvent for the reaction components and for the reaction product.

10. A process as claimed in claim 9, which consists in carrying out the reaction in the presence of an alkaline catalyst.

11. A process for the preparation of synthetic resinous products in which cresylic acid is heated together with formaldehyde and tung oil in the presence of cyclohexanol and an alkaline catalyst.

12. Composition of matter comprising the reaction product of about 100 parts of cresol, 75-200 parts of tung oil and about 25 parts of hexamethylenetetramine reacted at a temperature of substantially 190° C. or more.

13. Composition of matter obtained by the heating of a phenol with a fatty oil to a temperature approximately 190° C. and thereupon reacted with hexamethylenetetramine.

14. Process of preparing a composition of matter which comprises heating a mixture of a phenol and a fatty oil to approximately 190° C., and then reacting hexamethylenetetramine into the mixture of phenol and oil.

VICTOR H. TURKINGTON.